July 30, 1957
S. M. SILVER
2,801,034
MULTIPLE QUANTITY METERED DISPENSING
CARTON OR THE LIKE
Filed Aug. 16, 1956
4 Sheets-Sheet 3
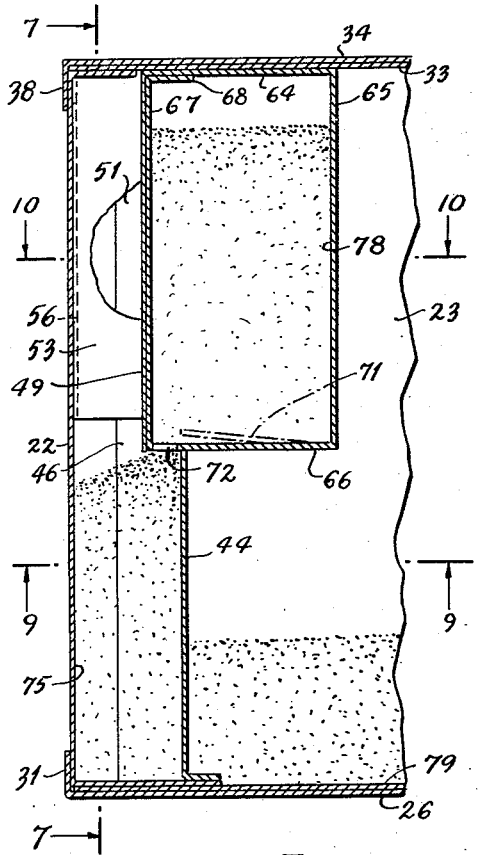
FIG.7
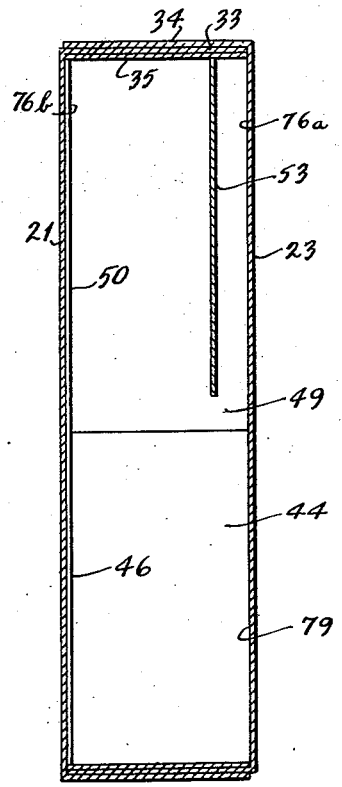
FIG.8
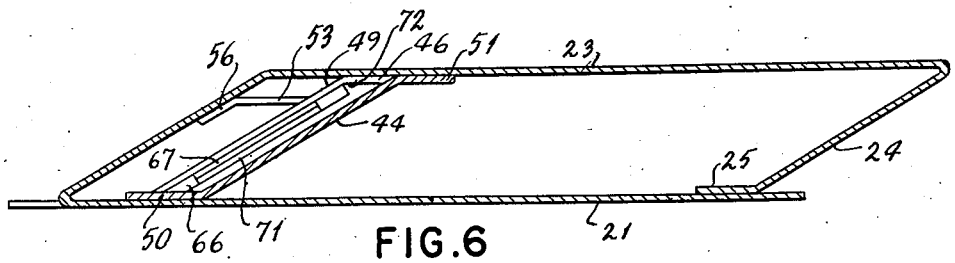
FIG.6
INVENTOR.
Stan M. Silver
BY 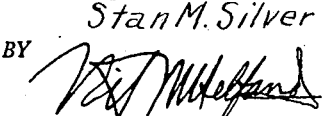
ATTORNEY

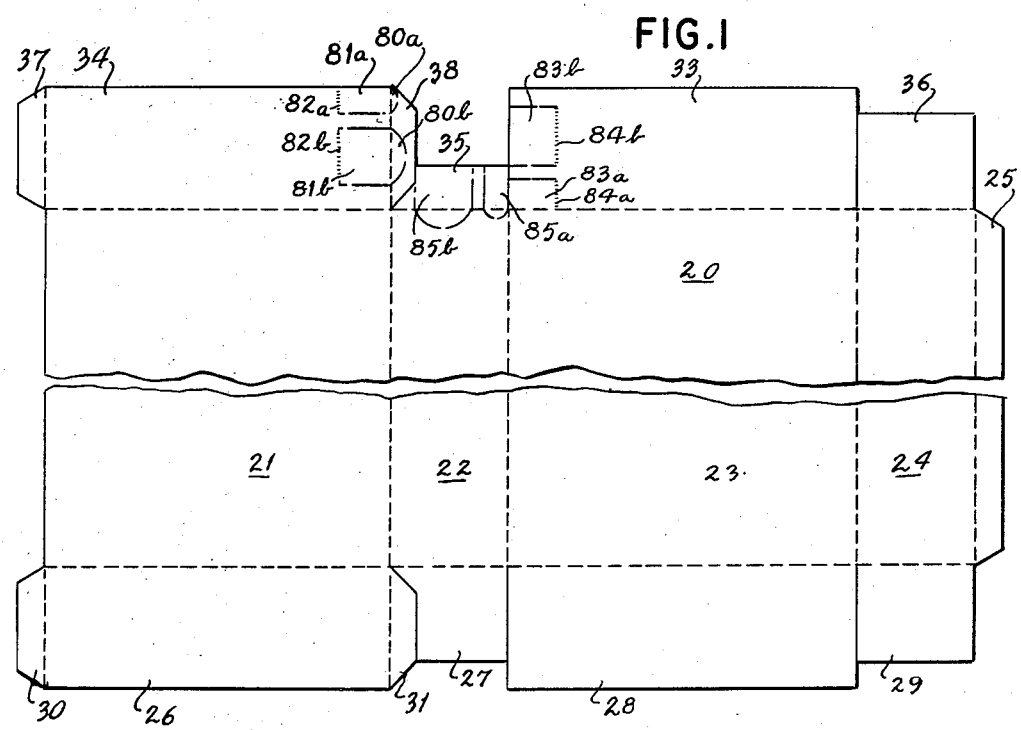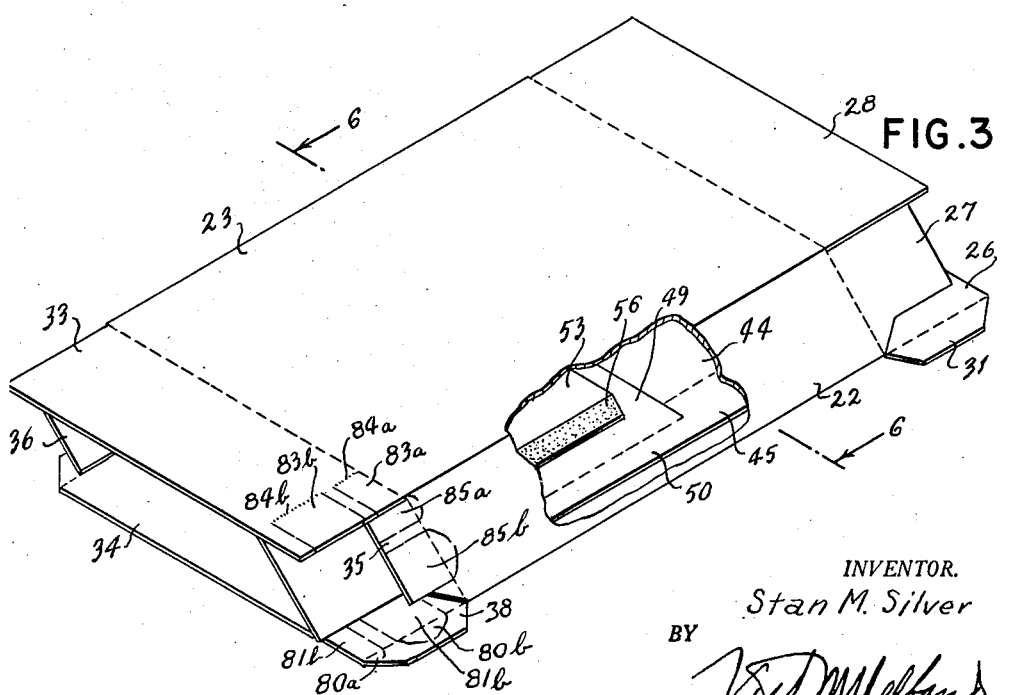

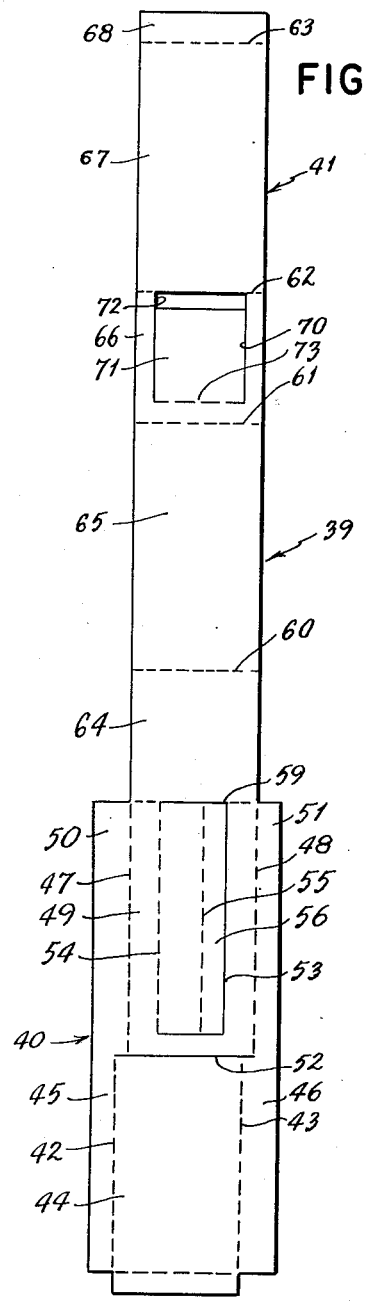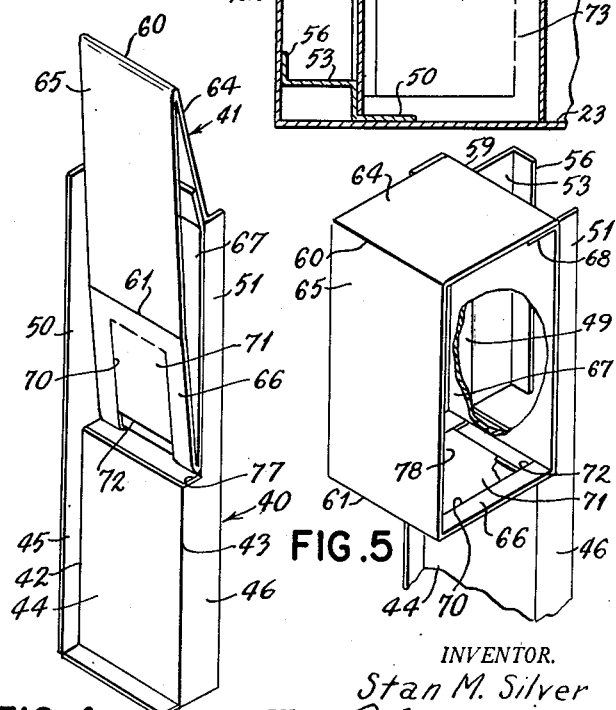

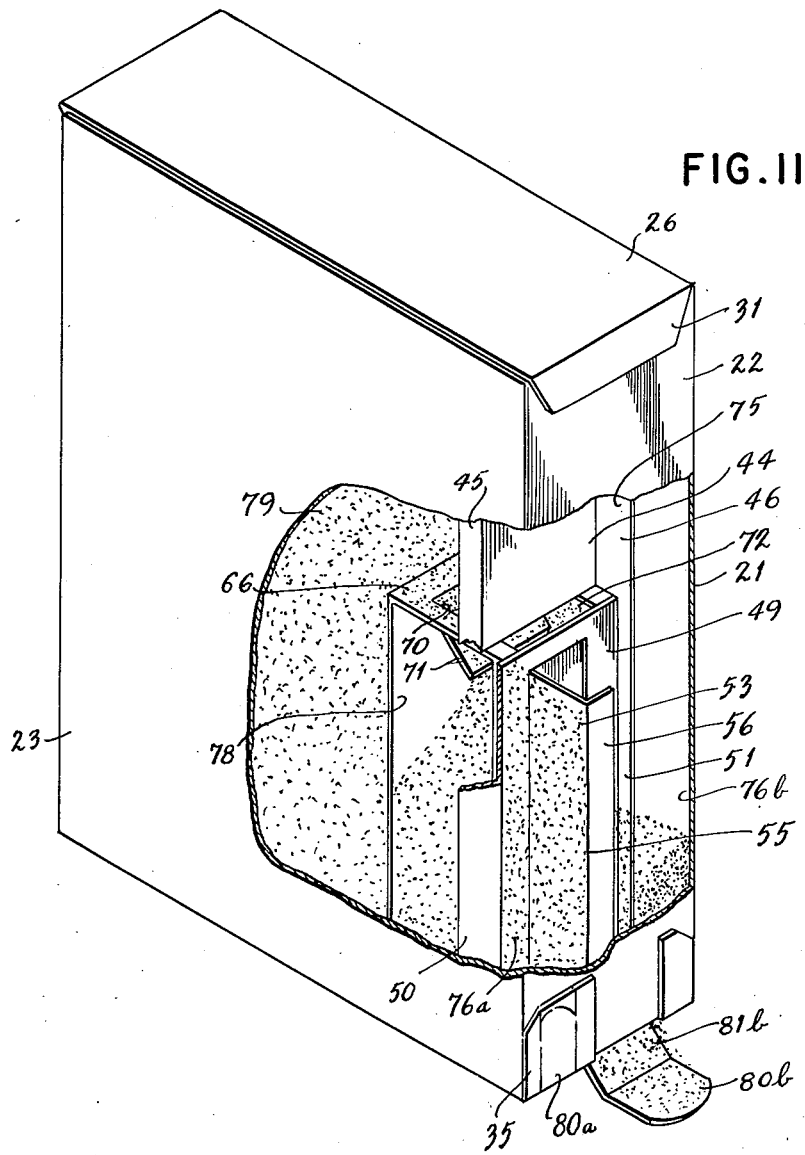

United States Patent Office 2,801,034
Patented July 30, 1957

2,801,034

MULTIPLE QUANTITY METERED DISPENSING CARTON OR THE LIKE

Stan M. Silver, New York, N. Y.

Application August 16, 1956, Serial No. 604,543

22 Claims. (Cl. 222—455)

The present invention relates to an automatic metering and dispensing container or carton, and particularly to a multiple quantity metering and dispensing container or carton, and is an extension of the invention described and claimed in my copending application, Serial No. 597,249, filed July 11, 1956, for a Metered Dispensing Container.

In my said copending application I have described and claimed a container or carton for comminuted or granular material, of generally conventional shape and formation, which, by the addition of a unitary cardboard or like insert, is converted to dispense evenly metered amounts of its contents at each dispensing use, from first to last. In the embodiment of the invention illustrated in said copending application, the one piece insert divides the carton interior into four compartments; namely, an outlet chute leading to the carton outlet formed in an upper part of the carton; a metering chamber below said outlet chute and in communication therewith at its upper end; a supply chamber alongside of the chute and likewise in communication with the upper end of the metering chamber; and a storage compartment connected with said supply chamber by a one way passage formed in the bottom wall of the latter, leading from the storage compartment into the supply chamber.

In the embodiment of the invention of said copending application, the one piece insert is so formed that it may be glued into place on a carton blank, before the latter is folded, by glue applied on a straight line gluing machine, in flat-folded state, before the carton blank is folded, and may be set up to form the several compartments by the same mechanism and at the same time that the carton is set up; the resultant carton being capable of filling on conventional filling apparatus.

The present invention is directed to the provision of an automatic metering and dispensing container or carton of the character described which is substantially similar in all respects to the metered dispensing container of my said copending application; but having the additional characteristic and advantage of being capable of automatically dispensing a selected one of a number of different metered quantities of its contents at each dispensing use thereof.

It is also an object of the present invention to provide a multiple quantity metered dispensing container or carton of the character described in which the metered dispensing structure is likewise provided by a one-piece, foldable cardboard or similar insert, capable of being glued on a straight line gluing machine, of being attached to the carton blank before the latter is folded, and of being set up for filling at the same time and by the same mechanism as the carton.

It is another object of the present invention to provide the metered dispensing containers or cartons of my invention with improved valve construction in the inlet from the storage compartment into the supply chamber thereof.

It is a further object of the present invention to provide a multiple quantity metered dispensing container or carton of the character described which is generally easy, simple and convenient to use and which may be made, assembled, set up and filled at substantially the same rate of speed as and at relatively little advance in cost over the conventional containers or cartons now used for the same or similar purposes.

The foregoing and other objects and advantages of the metered dispensing containers of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a foreshortened plan view of a cardboard blank for a carton embodying the present invention;

Fig. 2 is a plan view of a partitioning insert blank for the multiple quantity metered dispensing carton of the invention;

Fig. 3 is an isometric view of the assembled carton and insert in substantially folded flat position; partly broken away to show structural details;

Fig. 4 is an isometric view of the partitioning insert of Fig. 2, as it is disposed in the carton after it is squared but before being sealed at its bottom;

Fig. 5 is a fragmentary isometric view of the upper portion of the partitioning insert after it is fully set up; partly broken away to show details of its construction and of the disposal of its several parts;

Fig. 6 is a section taken on line 6—6 of Fig. 3;

Fig. 7 is a fragmentary elevational view of a partly filled metering carton of the invention, with one side wall removed and partly broken away to show detail;

Fig. 8 is a section taken on line 8—8 of Fig. 7;

Fig. 9 is a section taken on line 9—9 of Fig. 7;

Fig. 10 is a section taken on line 10—10 of Fig. 7; and

Fig. 11 is an isometric view of the carton of the present invention, shown in dispensing position; and partly broken away to show details of structure and operation.

Generally stated, the present invention consists in the formation of a multiple quantity metered dispensing carton by the use, in association with a carton of generally conventional size, shape and construction, of partition means that subdivide the carton interior to provide therewithin a metering chamber, a chute leading from the metering chamber to outlet means formed or defined in the carton wall, a discharge or supply chamber leading from the carton interior to the metering chamber, and a storage compartment from which material is fed into the supply chamber. The special feature of the present invention resides in the longitudinal partitioning of the chute into two or more passageways or channels, each communicating with the metering chamber and each having an individual outlet formed or defined in the carton wall, with an individual outlet closure that may be optionally opened separately or together with the closures of the outlets of the other channels, so that, when desired, only a portion of the measured quantity of the material in the metering chamber may be discharged or dispensed through one of the chute channels whose closure is opened, while another portion of the measured quantity of material is entrapped in one or more of the chute channels whose outlets remain closed.

In a preferred embodiment of the invention, the partitioning means which subdivide the carton interior into the several compartments and which subdivide the chute into the several channels or passageways are all integral and formed by a one-piece cardboard blank which may be glued on a straight line gluing machine and adhesively secured to the carton blank as the latter is glued and folded lengthwise into a flat, partly formed state. The cardboard insert blank, as in the invention of my copending application, is so cut and scored and so secured to the carton blank that, when the latter is set up for filling through its open bottom end, the insert blank is automatically set up, by the same mechanism, to set up and form, both, the several compartments of the carton as well as the several channels of the chute, as described above.

Referring now in greater detail to the embodiment of the present invention, in the form of a carton, illustrated in the accompanying drawings, such carton is formed from a cardboard blank, generally designated as 20, of suitable thickness and of generally conventional formation; being cut and scored to provide an outer side wall 21, an inner end wall 22, an inner side wall 23, and an outer end wall 24. The end wall 24 is preferably formed with a gluing tab 25, along its outer longitudinal edge, said tab 25 being preferably formed with tapering top and bottom edges. All of the side and end walls and the gluing tab are defined from one another by fold lines, in a conventional manner.

The walls of the carton blank 20 are provided with top and bottom flaps, defined by fold lines and foldable to form top and bottom closures. These include a bottom outer side wall flap 26, a bottom inner end wall flap 27, a bottom inner side wall flap 28, and bottom outer end wall flap 29. The end flaps 27 and 29 may preferably be shorter than the side wall flaps 26 and 28, and the outer side wall flap 26 is provided with a tapered end gluing tab 30, at its outer end and with a tapered end gluing tab 31, at its inner end; the latter being at least partly cut out from the inner end wall tab 27. The gluing tabs 30 and 31 are defined by conventional fold lines where they are joined to the flap 26.

The blank 20 is further provided with upper inner and outer side wall flaps 33 and 34, respectively, with a relatively short inner end wall flap or tab 35, and with an upper outer end wall flap 36. The upper flap 33 of the outer side wall is provided with preferably tapered end gluing tabs 37 and 38, at its outer and inner ends, respectively; the tab 38 being complementary, in part, to the tab 35.

The partitioning insert comprises a cardboard blank, generally designated as 39, of elongated shape, having a wider section, generally designated as 40, and a narrower section, generally designated as 41. The wider section 40 is of a length equal to the height of an end wall of the carton blank 20 or to the height of the interior of the carton, when fully set up, and of a width greater than the interior width of the carton when fully set up. The wider insert section 40 is so offset scored and cut as to provide a lower or outer portion thereof with longitudinally extending fold lines 42 and 43, that divide such lower portion into a central panel 44, equal in width to the inner width of the carton and having its longitudinal center disposed to one side of the longitudinal center of the insert, and into two tabs 45 and 46, one along each longitudinal edge of the panel 44; said tabs 45 and 46 being of unequal width. The insert section 40 is provided with an upper portion formed with two longitudinal fold lines 47 and 48, which divide such upper portion into a central panel 49, having its longitudinal center disposed to the other side of the longitudinal center of the section 40, and into tabs 50 and 51, of unequal width, and one to each side of the panel 49. The panels 44 and 49 are defined from one another by a cut line 52, which extends across the entire inner edges of both of the panels.

It may here be noted that, when the partitioning insert is in its final position in a set up carton, panel 44 will be disposed parallel to an end wall of the carton, to form the inner wall of the metering chamber; panel 49 will likewise be disposed parallel to such end wall, to form the inner wall of a chute; while tabs 45 and 46 and 50 and 51 form gluing tabs by which the insert is adhesively secured in place. Preferably, in order to make it possible for the insert section 40 to be flatly adhesively secured and disposed, as well as in spaced set up position, fold lines 42 and 47, along one side of section 40, may be scored for folding in one face of section 40, while fold lines 45 and 50 are scored in the other face of the insert section 40, so that tabs 45 and 50 are foldable in one direction relative to the panels 44 and 49, while tabs 46 and 51 are foldable in the opposed direction.

The panel 49 is provided with a longitudinally formed struck out tongue 53, extending from a short distance above the cut line 52 to the outer or upper edge of panel 49. The tongue 53 is cut away from the panel 49 at its top and bottom and along one of its long sides and is defined at its other long side by a fold line 54, scored for folding in the direction of the carton end wall adjacent which the insert section 40 is secured within the carton. The tongue 53 is formed with a fold line 55, extending the length thereof along a central point, to define between it and the adjacent cut line a gluing tab 56, adapted to be adhesively secured to the carton end wall adjacent to which the insert section 40 is secured.

The narrower insert section 41 is of the same width as panels 44 and 49 and is continuous with the latter, being defined therefrom by a fold line 59, scored to make the section 41 foldable in a direction opposed to that of tongue 53 and inwardly into the carton. The insert section 41 is of elongated shape and is divided by fold lines 60, 61, 62 and 63, all scored in the same face as the fold line 59, to divide the section 41 into an inner, relatively shorter panel 64, an inner longer panel 65, of approximately the same length as the panel 49, a center panel 66, of approximately the same size as panel 64, and an outer panel 67, equal in length to the panel 65, and a gluing tab 68, at the end of the section 41.

The panel 66 is formed with an opening 70, extending from a distance above the fold line 61 to the fold line 62, in which opening is disposed a valve tongue 71, terminating short of the fold line 62, at the end of panel 68, to provide an opening 72. The tongue 71 is hingedly arranged, to bend in one direction only; namely, in the direction in which the several panels of section 41 are foldable. For economy in manufacture, the tongue 71 may be integral with the panel 66, being die-cut therefrom to be fully cut away on its two longitudinal edges and only partly cut away at its base or inner end, leaving thin, spaced connections 73, which serve as hinges.

It has been found that by die cutting the tongue 71 from the side opposite to which it is intended to bend, such tongue becomes a one-way valve, readily foldable or bendable, under pressure that may be exerted by the carton contents, in the direction opposite to the side from which it was die-cut, in order to open the valve. Similar pressure in the opposite direction will readily close the valve but will be ineffective to swing the tongue through the opening from which it was cut.

In assembling the multiple quantity metered dispensing carton of the invention, an adhesive coat is applied to the outer face of gluing tab 68. The insert section 41 is then folded on fold line 60 and reentrantly folded on fold line 62, so that fold line 63 is in register with fold line 59 and tab 68 is then adhesively secured to the adjacent inner end portion of the inner face of panel 64, as will be clearly seen in Fig. 4 of the drawings. In this position, panel 67 will lie against panel 49, and the two panels 67 and 49, may, if desired be adhesively secured to one another along the portions to either side of tongue 71, by a previously appropriately applied glue, or the like.

Glue, or like adhesive is then applied, preferably on a straight line gluing machine, to the tabs 45 and 50 and 46 and 51, and to the tab 56 of the tongue 53, to the surface of each of them that will be disposed away from the adjacent blank portion when these tabs are folded. Glue is also applied to the outer face of tab 25 of the carton blank 20.

The partitioning insert, so folded and glued or glue coated is then placed with its section 40 disposed on the inner face of the carton blank 20, with its upper and lower edges in register with the upper and lower edges of the carton side and end walls, with the free edges of tabs 46 and 51 in close proximity to and directed toward the fold line between the side wall 21 and the inner end wall 22 of the blank 20 and with the remainder of section 40 lying over the inner end wall 22 and the side wall 23. The end wall 24 is then folded over the side wall 23 and the side wall 21 is folded over the end wall 22, side wall 23 and tab 25, to which it is adhesively secured by its marginal edge portion. By this operation, the side wall 21 will become adhesively secured to the tabs 46 and 51, while the tabs 46 and 51 will become adhesively secured to the tabs 45 and 50, forming a flat folded, open ended tube, with the upper end of insert section 41 extending between the upper closure flaps 33, 34 and 36 of the carton blank. In this folded flat state the partly formed carton may be compactly shipped and stored at the point of filling.

The carton may be set up for filling by first applying pressure to the opposed edges of the flattened assembly, to bring it into rectangular shape. This movement into rectangular shape causes the folding of the adhesively attached tabs of the insert section 40 along the fold lines 42 and 47 and 43 and 48 and brings about the disposition of the panels 44 and 49 in spaced parallel relation to the end wall 22. Panel 44, whose wider tab 46 is secured to the side wall 21, will be disposed a greater distance from the end wall 22 than panel 49, which is secured to the side wall 21 by its narrower tab 51, so that if the panels 44 and 49 are of approximately the same height, the metering chamber 75, defined by the panel 44, will be of greater volume than the chute 76, defined by the panel 49. This movement of the flattened carton assembly will also form an opening 77, at the top of the metering chamber 75, externally of the chute 76, along the cut line 52. It will be apparent that, inwardly of the panel 49, the metering chamber 75 and chute 76 are continuous.

The movement of the flat folded assembly into rectangular shape will also cause the tongue 53 or the portion thereof between fold lines 54 and 55 to become erected, to be perpendicular to both, end wall 22 and panel 49, to partition the chute 76 into two channels 76a and 76b; the gap left in the panel 49 by the setting up of the tongue 53 being backed up by the panel 67. It will be seen that, for proper formation of the channels 76a and 76b, the distance of fold line 48 of the insert section 40, when secured to the inner face of the blank 20, should, preferably, equal and not exceed the width of the tongue 53 between fold lines 54 and 55.

After the folded flat assembly is thus spread into rectangular shape, the upper end wall flaps 35 and 36 are inwardly folded; the upper side wall flap 33 is likewise inwardly folded and adhesively secured to the end wall flaps 35 and 36; and then the upper side wall flap is inwardly folded and secured to the side wall flap 33, and its end tabs 37 and 38 secured, respectively to end walls 24 and 22, to thereby form the top wall or closure of the carton.

In commercial usage, the folding of the flaps 33, 34, 35 and 36 is mechanically effected, after glue has been appropriately applied. It will be apparent that as the folding mechanism operates to fold flaps 33, 34 and 35 inwardly, it will also engage against the folded portion of the section 41 that projects between such flaps, as described above and as shown in Fig. 3 of the drawings, to fold or push the panel 64 into horizontal position, perpendicular to the end wall 22. This will move panel 65 inwardly and downwardly to a position parallel to panel 49, and panel 66 to a horizontal position, parallel to panel 64, to complete a substantially rectangular chamber 77. When panel 66 which forms the bottom wall of the chamber 78 is in its final position, its end portion will rest on the upper edge of the metering chamber wall 44, with its opening 72 in register with the opening 77 into the metering chamber 75; the tongue 71 being of a length that its outer edge portion will likewise be supported on the top edge of the metering chamber wall, to provide additional means for preventing its movement outwardly of the chamber 78, thereby further limiting it to inward movement into the chamber 78, as clearly shown in Fig. 5 of the drawings.

In this state, the carton interior is subdivided by the insert into four separate chambers or compartments; namely, the relatively narrow chute 76, the metering chamber 75, below, which is complete except for its bottom wall; the supply chamber 78, which communicates with the metering chamber through the registering openings 72 and 77; and the remainder of the carton interior which forms a storage or reserve compartment 79, and communicates only with the supply chamber 78, through the valve opening 70 in panel 66. At this stage, also, the chute is divided into two channels 76a and 76b, both of which are open to the metering chamber 75, a short distance from the top thereof.

The set up carton is filled in inverted position, through the open bottom thereof, as is conventional, on conventional filling apparatus and at the same rate of speed as similar, non-metering cartons. In filling, all of the four compartments of the carton are filled; the supply chamber 78 being filled through the valve opening 70, the weight of the material causing the valve tongue 71 to open inwardly into the supply chamber 78, to permit admission of material thereinto, as illustrated in Fig. 11 of the drawing. Generally, the carton is filled to somewhat less than full capacity, as is conventional. After filling, the carton bottom is sealed by the inward folding of the bottom end and side wall flaps, which are adhesively secured to one another in the conventional manner. This operation will also supply the bottom for the metering chamber 75.

Each of the chute channels 76a and 76b is provided with an individual outlet and closure therefor. Preferably, such outlets and closures are merely defined, by suitable scored and cut lines formed in the carton wall, to be actually formed by the user, as desired. While such outlets may be formed in any part of any of the outer walls of the chute, I prefer, for ease of manufacture and convenience of use, to form the same in the top wall of the carton, at its junction with the chute forming end wall thereof. Each of such outlets may comprise a tear-away, hinged top wall section over one of the chute channels, preferably of somewhat lesser area than the cross section of the respective channel over which it is formed.

Thus, the closure over channel 76a may comprise a tear-away tongue portion 80a defined by perforated or otherwise scored tear away lines on three of its sides, formed in the gluing tab 38 of the top flap 34 and connected at its inner end or base to an extenion 81a, defined on its two sides by tear away lines formed in the flap 34 and at its base by a scored fold line 82a, forming a hinge. A corresponding rectangular tear away tongue 83a is formed in the underlying portion of the top flap 33, terminating in its outer edge and defined on its two sides by tear away lines and at its base by a scored fold line 84a. A further, similar tear away tongue 85a is formed in the underlying portion of the tab 35, extending from its outer edge inwardly and defined by tear away side lines of the conventional type. In closing the top of the carton, the tongue 80a is left unglued to the underlying portion of the end wall 22, preferably by coating, as by printing, such underlying portion with a glue repellent coating, as at 86a; the tongue section 81a is adhesively secured to the underlying tongue section 83a;

but the latter is left free and unattached to the underlying section 85a, preferably by the same method of coating the last section with a glue repellent substance. Thus, when it is desired to provide an outlet opening for the channel 76a, the tongue 80a is engaged by the user and pulled upwardly, to thereby simultaneously pull up the tear away tongues 81a and 83a and expose the tear away section 85a, which may be torn off or pulled away, to provide the outlet opening, 87a, which may be closed again, when desired.

Similar outlet and closure forming elements, 80b, 81b, 83b and 85b may be provided above the chute channel, 76b, which may be formed and operated in the same manner as the closure above the channel 76a.

While, as has been stated, all of the four carton compartments, including the chute 76, are initially almost completely filled, so that it would be assumed that the initial dispensing from the carton would contain all of the contents of the metering chamber plus at least part of the contents of the chute, it has been established by repeated experiment and use that when the compartments are so proportioned that the metering chamber 75 is of greater capacity than the chute and the supply chamber 78 of greater capacity than the metering chamber 75, repeated agitation of the carton by repeatedly inverting and uprighting the same an appreciable number of times brings about a backflow of material from the supply chamber to the storage compartment, from the metering chamber to the supply chamber and from the chute to the metering chamber, until the chute becomes completely empty, when the backflow stops.

The agitation required to effect this emptying of the chute by backflow is no greater and no different from the agitation to which a carton of the type to which the present invention relates may be subjected to in the course of transportation from the filling apparatus to the hand of the consumer, so that its chute, when it reaches the consumer, will be substantially completely empty, and the first dispensed quantity from the carton will be from the metering chamber only and will amount substantially exactly to the capacity of such metering chamber and no more, in the same manner as all subsequent chambers. This backflow due to agitation remains true whether the chute comprises a single channel or is subdivided into a plurality of channels.

In general, the use of the carton for dispensing different measured quantities of its contents is as follows: When it is desired to dispense the maximum quantity possible; namely, the full contents of the metering chambers, the closures over both of the chute channels 76a and 76b are opened by pulling at the tongues 80a and 80b. The carton is then inverted in the conventional manner and at the conventional rate of inversion. Because of the specific arrangement of the inlet 72 from the supply chamber 78 to the metering chamber 75, there is a continuity of material in the two chambers which fills such communicating opening and keeps it filled until the metering chamber is emptied, so that there will be no flow of material between the two chambers during the initial tilting of the carton to horizontal position and, of course, no exchange whatever after the tilting has passed the horizontal. In the last position, the metering chamber will be emptied through both of the channels 76a and 76b thereof, through their respective open outlets.

After the contents of the metering chamber are completely discharged, the carton is uprighted again. This brings about the flow of material from the supply chamber 78 into the now empty metering chamber 75, through the opening 72, until the metering chamber is completely filled, leaving the supply chamber partly empty. On the next dispensing movement, while the carton is in inverted position, to empty the metering chamber, material will flow from the storage compartment through the valve opening 70; the tongue 71 being depressed by the weight of the material upon it to open such opening 70 for the flow of material into the supply chamber. When the carton is again uprighted at the end of the second dispensing movement, the metering chamber is again refilled from the supply compartment, the valve tongue 71, under pressure of the material in the supply chamber moving back into closed position, to prevent backflow of material from the supply chamber into the storage compartment.

It may here be pointed out that material from the storage compartment to the supply chamber always moves or flows along a smooth and even surface; namely, along the surface of the panel 44, which directs it toward the inlet opening 70 into the supply chamber, and that substantially all of the material in the storage compartment is eventually directed and emptied into the supply chamber, without any of it being trapped or in some other manner retained in the storage compartment.

When it is desired to dispense a lesser quantity than the full volume of the metering chamber 75, only one of the channels 76a and 76b is activated by the opening of its closure; the closure of the other channel being left unopened, and the dispensing operation carried out in the manner described in the preceding paragraphs. Thus, if channel 76a is activated by the opening of its closure 81a and the carton inverted for dispensing, the material from the metering chamber will flow into both of the channels, 76a and 76b, in the latter of which it will be entrapped and from the former of which it will flow out of the carton. When the carton is uprighted again, after dispensing, the material entrapped in channel 76b will flow back into the metering chamber. As the passage between the channel 76b and the metering chamber is the full size of the channel, the flow back of material will be free, unrestricted and rapid and will be completed before the metering chamber is filled from the supply compartment through the relatively narrow passageway 72.

It will be apparent that all dispensings through each of the channels 76a and 76b will always be of substantially uniform volume or quantity. It will also be clear that the volume dispensed through each of the channels may be predetermined by the specific construction of the insert and the proper proportioning of the channels relative to one another and to the metering chamber. In conection with the last point, it will be apparent that, once the dimensions of the carton itself are fixed, the volume of the chute will be determined by the height of the panel 49 and its distance from the end wall 22, which, in turn, may be determined by the width of the tongue 53 less its tab 56, and that the relative proportions of the several channels will be determined by the position of the tongue 53 in the panel 49. Similarly, the volume of the metering chamber will be determined by the height of the panel 44 and its distance from the end wall 22. Where the insert is in one piece, as illustrated, the latter dimension will be determined by the spacing of panel 49 from end wall 22 plus the amount of offset of panels 44 and 49 relative to one another.

This completes the description of the multiple quantity metered dispensing container of the present invention. It will be evident that in spite of its increased and varied utility, it is of relatively simple construction, involving very little more than the two parts forming the metered dispensing container of my copending application and very little more by way of assembling the same. It will also be apparent that the carton of the present invention may be assembled with great speed and rapidity without the need of modifying any of the conventional equipment and machinery used in assembling and setting up cartons of the same type and with the addition of but minor equipment. It will also be apparent that the cartons of the present invention may be filled by conventional equipment and at the standard rate of speed for similar cartons now in use.

It will likewise be apparent that the cartons of the present invention are simple and easy to use and that they are accurate in the dispensing of the several different quantities they are capable of dispensing, from first to last.

It will also be apparent that the cartons of the present invention are greatly reinforced by the compartmenting insert, to the extent where lighter material may be used for the carton proper, to compensate, at least in part for any cost increase resulting from the use of the insert, to thereby make the cartons of the invention economical to make and use.

It will be further apparent that numerous modifications and variations may be made in the metering dispensing container of the present invention, in accordance with the principles of the invention hereinabove set forth by anyone skilled in the art, without the exercise of any inventive ingenuity. I desire, therefore, to be protected for any and all such modifications and variations that may be made within the spirit of the invention and the scope of the claims hereto annexed.

What I claim is:

1. A metered dispensing container, comprising a receptacle and partition means within said receptacle dividing the same into a plurality of compartments, including a metering chamber and a plurality of discharge channels, each communicating with said metering chamber at one end, and individual outlet means formed in said receptacle for each of said channels.

2. The metered dispensing container of claim 1, wherein said partition means is integral.

3. A metered dispensing container, comprising a receptacle, partition means within said receptacle dividing the same into a plurality of compartments, including a metering chamber and a chute communicating with said metering chamber, partition means dividing said chute into a plurality of channels, each open at one end to said metering chamber, and individual outlet means for each of said channels formed in said receptacle.

4. The metered dispensing container of claim 3, wherein said chute forming partition means and said chute dividing partition means are integral and comprise a partition having a central portion thereof struck out to form a tongue, said tongue connected to said partition along one edge and having a marginal portion of its opposed edge offset and secured to the wall of said receptacle, and means closing the opening formed by said struck out tongue.

5. The metered dispensing container of claim 3, wherein said partition means forming said metering chamber, said chute and said channels are integral.

6. A metered dispensing container, comprising a receptacle, partition means within said receptacle and forming with a section of the receptacle wall a metering chamber open at one end and a plurality of discharge channels each communicating at one end with a portion of the open end of said metering chamber, said receptacle having individual outlet means formed therein for each of said discharge channels.

7. The metered dispensing container of claim 6, wherein said partition means forming said metering chamber and said channels are integral.

8. The metered dispensing container of claim 6, wherein said partition means forming said channels comprises a wall section disposed substantially parallel to a wall section of said receptacle and in spaced relation thereto, said partition wall section having a tongue struck out therefrom, said tongue connected thereto along one edge thereof and having the marginal portion of the opposed edge thereof secured to said receptacle wall section, and means closing the opening formed by said struck out tongue.

9. A metered dispensing container, container, comprising a receptacle having top and bottom wall sections and a connecting upright wall section, partition means within said receptacle dividing the interior thereof into four compartments, including a metering chamber in a lower portion of said receptacle, an outlet chute immediately above said metering chamber and continuous with a portion thereof, said metering chamber being of greater cross section than said chute, a storage chamber, and a supply chamber alongside said chute, said supply chamber being disposed above said metering chamber and having an outlet opening formed therein communicating with the top of said metering chamber and an inlet opening formed therein communicating with said storage chamber, valve means at said inlet opening for substantially preventing the outflow of material through said inlet opening, partition means dividing said chute into a plurality of channels each open at its lower end to said metering chamber, and individual outlet means defined in the receptacle wall for each of said channels.

10. The dispensing container of claim 9, wherein said partition means forming said compartments are integrally formed.

11. The dispensing container of claim 9, wherein the partition means forming said compartments and dividing said chute are integrally formed.

12. The metered container of claim 9, wherein said metering chamber is of greater capacity than said chute and said supply chamber is of greater capacity than said metering chamber.

13. The dispensing container of claim 9, wherein said metering chamber is formed with an open top and said chute overlies and is continuous with a portion of asid open top of said metering chamber, and said supply chamber is formed with a bottom wall, said bottom wall having a portion thereof overlying a portion of said open top of said metering chamber, and wherein said communicating opening is formed in said overlying portion of said bottom wall and said inlet opening is formed in said bottom wall alongside of said communicating opening.

14. A metered dispensing container, comprising a carton having top and bottom wall sections and connecting upright wall sections forming side and end walls of the carton, partition means within said carton cooperating with one of said upright wall sections and adjacent upright wall sections to divide the carton interior into a plurality of compartments, including a metering chamber along a lower portion of said first named side wall section, said metering chamber open at its top, a chute immediately above said metering chamber alongside an upper portion of said first named upright wall section and overlying a portion of the open top of said metering chamber and continuous therewith, a storage chamber, and a supply chamber alongside said chute and above said metering chamber, said supply chamber having a bottom wall, said bottom wall having one end thereof overlying another portion of the open top of said metering chamber, said overlying bottom wall end having an outlet opening formed therein communicating with the interior of said metering chamber, said bottom wall of said supply chamber having an inlet opening formed therein continuous with said outlet opening, a valve tongue at said inlet opening for substantially preventing the outflow of material through said inlet opening, said valve tongue hinged by one end at the inner end of said inlet opening for movement inwardly into said supply chamber, with its free end supportable on the edge of said metering chamber, and chute outlet means defined in a wall section of said carton.

15. A metered dispensing container comprising a carton having top and bottom wall sections and connecting upright wall sections forming side and end walls of the carton, partition means within said carton cooperating with one of said upright wall sections and its adjacent wall sections to divide the interior of the carton into a plurality of compartments, including a metering chamber along a lower portion of said first named wall section, said metering chamber having an open top, a chute immediately above said metering chamber and alongside said first named upright wall section and overlying a portion of the open top of said metering chamber and continuous therewith, a storage chamber, and a supply chamber, said supply chamber having a bottom wall, said bottom wall having one end thereof overlying another portion of said open top of said metering chamber, said overlying end portion having an opening formed therein communicating with the interior of said metering chamber, said bottom wall of said supply chamber having an inlet opening formed therein, valve means associated with said inlet opening for substantially preventing the outflow of material from said supply chamber therethrough, partition means dividing said chute into a plurality of discharge channels each open at one end to said metering chamber, and individual outlet means for each of said channels defined in a wall section of said carton.

16. The metered dispensing container of claim 15, wherein said inlet opening in said supply chamber bottom wall is continuous with said communicating opening therein and wherein said valve means comprises a tongue associated with said inlet opening and hinged by one end at the inner end of said inlet opening for movement into said supply chamber and having its outer end supportable on the edge of said metering chamber to prevent its movement out of said supply chamber.

17. The metered dispensing container of claim 15, wherein said partition means forming said chute and said partition means dividing said chute into discharge channels are integral.

18. The metered dispensing container of claim 15, wherein said partition means dividing said carton interior into compartments and the partition means dividing said chute into discharge channels are integrally formed.

19. A metered dispensing container, comprising a carton having top and bottom wall sections and upright connecting wall sections forming side and end walls of the carton, partition means within said carton comprising a cardboard strip of a height equal to the height of the carton interior and of a width greater than the width of the carton interior, said strip longitudinally offset scored to form a lower central panel of a width equal to the width of said carton interior, said panel having gluing tabs at each side thereof, and an upper central panel equal in width to said lower panel and offset relative thereto, said panels separated by a cut line, said strip secured by said tabs within said carton in parallel relation to one upright wall section thereof, said lower panel forming with a lower portion of said upright wall section an open top metering chamber, said upper panel forming with an upper portion of said upright wall section a chute overlying a portion of the open top of said metering chamber, partition means dividing said chute into a plurality of uprightly extending discharge channels, each open at one end to said metering chamber and each having an individual outlet therefor formed in a wall section of said carton.

20. The metered dispensing container of claim 19, wherein said chute dividing partition means are integral with said strip.

21. The metered dispensing container of claim 19, wherein said chute dividing partition means comprises a section struck out from said upper panel, said struck out section connected to said panel along a vertical edge thereof and offset relative thereto, said struck out section having the marginal portion of the opposed edge thereof offset and secured to said upright wall section, and means sealing the opening formed by said struck out section.

22. The metered dispensing container of claim 19, wherein said strip is formed with an integral extension at the upper end of said upper panel of equal width with said upper panel, said extension folded at its base inwardly, toward the interior of said carton and scored transversely, intermediate its ends, at spaced intervals, to form an inner end panel, an inner intermediate panel, an outer intermediate panel, an outer end panel and a gluing tab at the end of the outer end panel, said inner end panel and said outer intermediate panel being of substantially equal length and said inner intermediate panel and outer end panel each being substantially equal in length to the height of the said chute forming panel, said extension folded to have the outer end panel disposed against the said chute forming panel, said folded extension defining with said upper, chute forming panel and said carton upright wall sections at each edge thereof a supply chamber for said metering chamber, the outer intermediate panel forming the bottom wall of said supply chamber and having its outer end portion overlying a portion of the open top of said metering chamber, said outer end portion having an outlet opening formed therein communicating with the interior of said metering chamber, said outer intermediate panel having an inlet opening formed therein adjacent said outlet opening and valve means set into said opening to prevent the flow of material out of said supply chamber therethrough, and wherein said partition means dividing said chute comprises a section struck out from said upper panel, said struck out section connected to said upper panel along one longitudinal edge thereof and offset relative to said panel along said edge, said struck out section having the marginal portion of the opposed edge thereof offset and secured to said upright wall section, said outer end panel sealing the opening formed by said offset struck out portion.

No references cited.